US012724321B2

(12) United States Patent
Won et al.

(10) Patent No.: US 12,724,321 B2
(45) Date of Patent: Sep. 1, 2026

(54) CAMERA MODULE INCLUDING APERTURE

(71) Applicant: Samsung Electronics Co., Ltd., Suwon-si (KR)

(72) Inventors: Dong Joon Won, Suwon-si (KR); Seung Hak Lee, Suwon-si (KR); Min Ook Kim, Suwon-si (KR); Kyung Sung Chu, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 315 days.

(21) Appl. No.: 18/637,900

(22) Filed: Apr. 17, 2024

(65) Prior Publication Data

US 2025/0116913 A1 Apr. 10, 2025

(30) Foreign Application Priority Data

Oct. 5, 2023 (KR) ........................ 10-2023-0132854

(51) Int. Cl.
*G03B 9/06* (2021.01)
*H02K 41/035* (2006.01)

(52) U.S. Cl.
CPC ........... *G03B 9/06* (2013.01); *H02K 41/0354* (2013.01)

(58) Field of Classification Search
CPC ........ G03B 9/06–26; G03B 2205/0069; G03B 30/00; G03B 17/12; H02K 41/0354; H04N 23/55; G02B 5/005; G02B 27/0081
See application file for complete search history.

(56) References Cited

U.S. PATENT DOCUMENTS

| | | | | |
|---|---|---|---|---|
| 5,321,923 | A | 6/1994 | Oda | |
| 8,073,317 | B2 | 12/2011 | Kitano | |
| 8,792,166 | B2 | 7/2014 | Watanabe et al. | |
| 9,285,604 | B2 | 3/2016 | Yuge et al. | |
| 10,401,589 | B2 | 9/2019 | Murakami | |
| 2020/0007721 | A1* | 1/2020 | Jeong | G03B 9/06 |

FOREIGN PATENT DOCUMENTS

KR 20200009823 A 1/2020

* cited by examiner

*Primary Examiner* — Stephone B Allen
*Assistant Examiner* — Adam W Booher
(74) *Attorney, Agent, or Firm* — Wolf, Greenfield & Sacks, P.C.

(57) ABSTRACT

A camera module includes a lens assembly, at least two blades that are on a top surface of the lens assembly and define a lens light entrance hole, a moving drive magnet, a fixed drive magnet, a blade controller that is coupled to the moving drive magnet and to the at least two blades, where the blade controller is configured to control a movement of the at least two blades, a lens assembly body, where the lens assembly and the fixed drive magnet are on the lens assembly body, and a frame that at least partially surrounds the lens assembly body and includes a coil that faces the moving drive magnet, where the blade controller is configured to adjust a diameter of the lens light entrance hole by controlling the moving drive magnet to move based on a current applied to the coil.

20 Claims, 13 Drawing Sheets

FIG. 9

CAMERA MODULE INCLUDING APERTURE

CROSS-REFERENCE TO RELATED APPLICATION

This application claims priority from Korean Patent Application No. 10-2023-0132854 filed on Oct. 5, 2023 in the Korean Intellectual Property Office, and all the benefits accruing therefrom under 35 U.S.C. 119, the contents of which in its entirety are herein incorporated by reference.

TECHNICAL FIELD

The present disclosure relates to a camera module of an electronic device.

BACKGROUND

With the development of Information Technology (IT), electronic devices such as smartphones with camera modules, tablet personal computers (PCs), laptops, and portable cameras are being widely distributed.

Camera modules are becoming miniaturized to be included in electronic devices, while also incorporating various functions. Recently, there is a desire for mobile and miniaturized cameras to implement apertures comparable to those of digital single lens reflex (DSLR) cameras.

However, it may be difficult to implement mechanical apertures as electronic devices become lighter and smaller.

SUMMARY

Aspects of the present disclosure provide a camera module including an aperture that utilizes the repulsive force of magnets while operating with a bistable actuator system.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a camera module that includes a lens assembly, at least two blades that are on a top surface of the lens assembly and define a lens light entrance hole, a moving drive magnet, a fixed drive magnet, a blade controller that is coupled to the moving drive magnet and to the at least two blades, where the blade controller is configured to control a movement of the at least two blades, a lens assembly body, where the lens assembly and the fixed drive magnet are on the lens assembly body, and a frame that at least partially surrounds the lens assembly body and includes a coil that faces the moving drive magnet, where the blade controller is configured to adjust a diameter of the lens light entrance hole by controlling the moving drive magnet to move based on a current applied to the coil.

According to some embodiments of the present disclosure, there is a camera module that includes a lens assembly, at least two blades that are on a top surface of the lens assembly and define a diameter of a lens light entrance hole, a moving drive magnet, a fixed drive magnet, an aperture cover that is on top surfaces of the at least two blades and includes a circular opening that overlaps the lens light entrance hole, a blade controller including a connector portion that is connected to bottom surfaces of the at least two blades, where the blade controller includes a slide part that accommodates the moving drive magnet, and where the blade controller is configured to adjust a length of the connector portion based on a movement of the moving drive magnet, a first lens assembly body including a slide coupling area and a groove, where the slide coupling area is on a first side of the first lens assembly body that faces a first surface of the moving drive magnet and is coupled with the slide part, and where the groove accommodates the fixed drive magnet, a second lens assembly body defining an opening on a first side of the second lens assembly body that faces the slide coupling area, and a frame including a coil on a first side that faces a second surface of the moving drive magnet that is opposite to the first surface of the moving drive magnet, where the blade controller is configured to adjust a diameter of the lens light entrance hole by moving the moving drive magnet based on a current applied to the coil.

According to some embodiments of the present disclosure, there is a camera module that includes a lens assembly including a lens, blades that are on a top surface of the lens and define a lens light entrance hole, a blade controller including a connector portion and a slide part that are coupled to the blades and configured to control a movement of the blades, an aperture actuator including a moving drive magnet that is in the slide part, a fixed drive magnet that is on a first surface of the moving drive magnet, a coil that is on a second surface of the moving drive magnet, and a hole sensor that is configured to detect a position of the moving drive magnet, and a driver chip configured to control a current applied to the coil based on the position of the moving drive magnet.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which:

FIG. 9 is a side view illustrating an aperture actuator with an open aperture according to some embodiments of the present disclosure.

DETAILED DESCRIPTION

Figure 1:
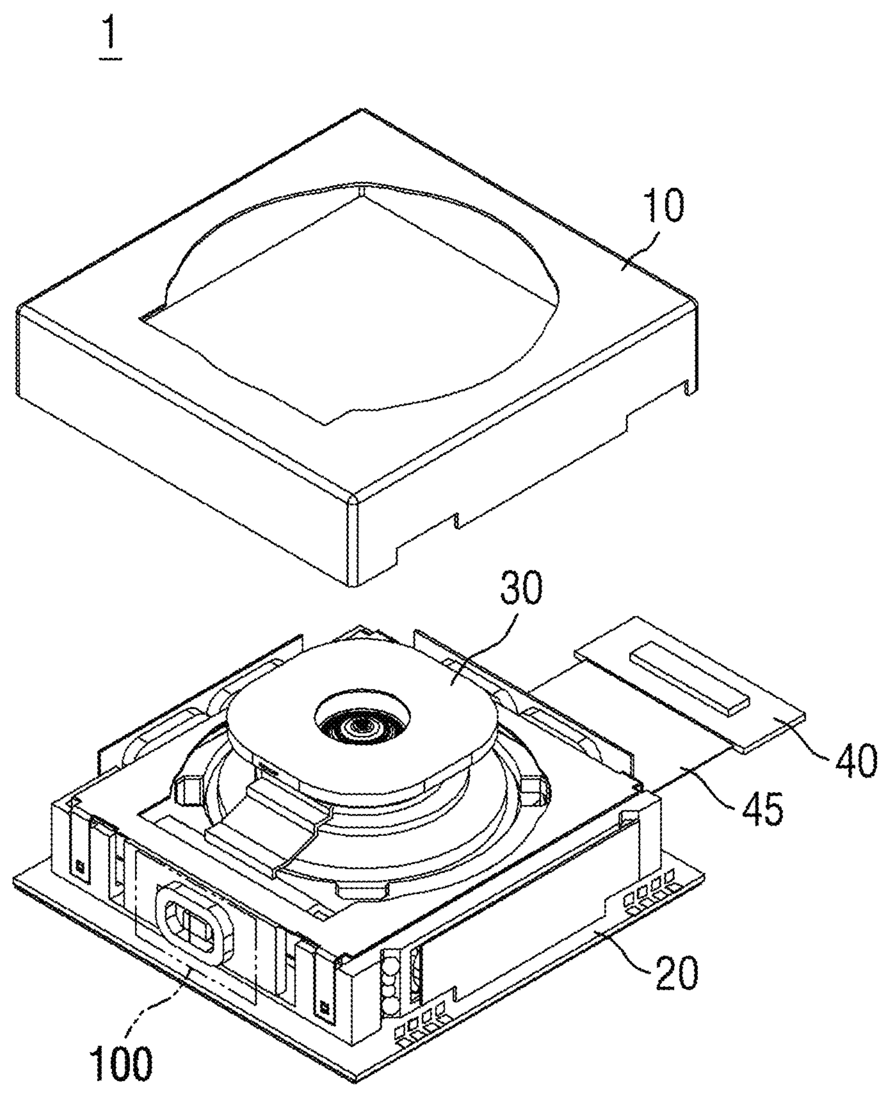
FIG. 1 is an exploded perspective view of a camera module according to some embodiments of the present disclosure.

To clarify the present disclosure, parts that are not connected with the description will be omitted, and the same elements or equivalents are referred to by the same reference numerals throughout the specification. Further, since sizes and thicknesses of constituent members shown in the accompanying drawings are arbitrarily given for better understanding and ease of description, the present disclosure is not limited to the illustrated sizes and thicknesses. In the drawings, the thickness of various components are exaggerated for clarity. In the drawings, for better understanding and ease of description, thicknesses of some components are excessively displayed.

It will be understood that when an element is referred to as being "on" another element, it can be directly on the other element or intervening elements may also be present. In contrast, when an element is referred to as being "directly on" another element, there are no intervening elements present. Further, spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly. In addition, unless explicitly described to the contrary, the word "comprises", and variations such as "comprises" or "comprising", will be understood to imply the inclusion of stated elements but not the exclusion of any other elements. As used herein, the phrase "at least one of A, B, and C" refers to a logical (A OR B OR C) using a non-exclusive logical OR, and should not be construed to mean "at least one of A, at least one of B and at least one of C." As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements and/or components, but do not preclude the presence or addition of one or more other features, steps, operations, elements, components and/or groups thereof. The term "connected" or "coupled" may be used herein to refer to a physical and/or electrical connection and may refer to a direct or indirect physical and/or electrical connection. Components or layers described with reference to "overlap" in a particular direction may be at least partially obstructed by one another when viewed along a line extending in the particular direction or in a plane perpendicular to the particular direction.

Figure 2:
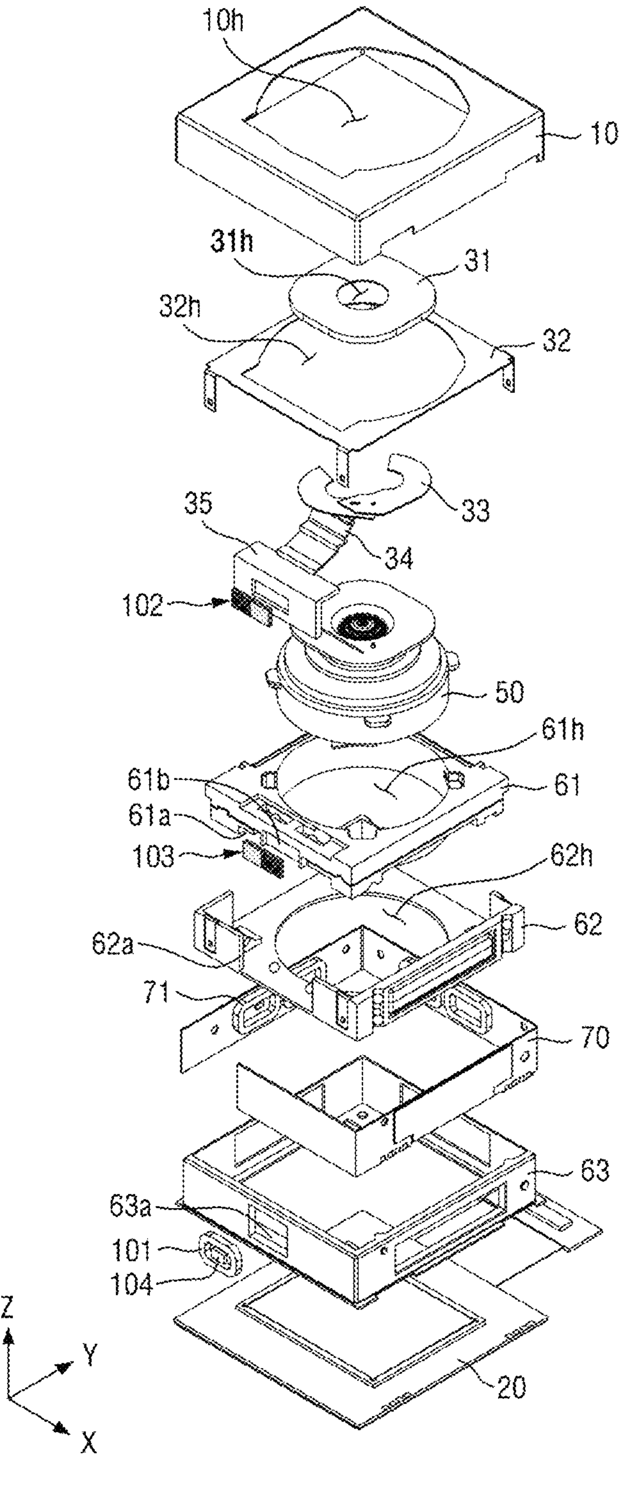
FIG. 2 is an exploded perspective view of the camera module of FIG. 1.
Figure 3:
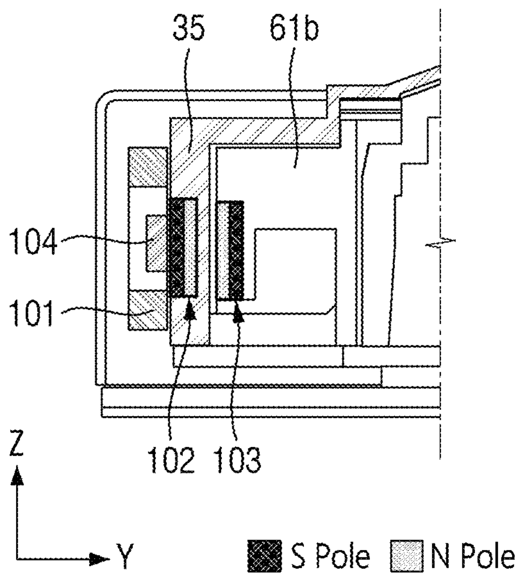
FIG. 3 is a side view of a camera module including an aperture actuator according to some embodiments of the present disclosure.

In this application, the term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit that executes code; a memory circuit that stores code executed by the processor circuit; other suitable hardware components that provide the described functionality, such as, but not limited to, transceivers, routers, input/output interface hardware, among others; or a combination of some or all of the above, such as in a system-on-chip. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. The term code, as used below, may include software, firmware, and/or microcode, and may refer to computer programs, routines, functions, classes, data structures, and/or objects. FIG. 1 is an exploded perspective view of a camera module 1 according to some embodiments of the present disclosure, and FIG. 2 is an exploded perspective view of the camera module 1 of FIG. 1. FIG. 3 is a side view of a camera module including an aperture actuator according to some embodiments of the present disclosure.

Referring to FIGS. 1 and 2, the camera module 1 includes a shield case 10, a printed circuit board (PCB) 20, an aperture module 30, an aperture actuator 100, a lens assembly 50, a lens assembly body 61 and 62, a frame 63, a flexible printed circuit board (FPCB) 70, and a flex board 45 and a driver chip 40, which are connected to the PCB 20.

The shield case 10 includes an open aperture 10*h* and may be configured to cover or overlap the camera module 1 from the top in a downward direction along a Z-axis direction. The shield case 10 may be formed of, for example, a metal material or a material with a specified hardness (e.g., a metal or reinforced plastic). The PCB 20, the aperture module 30, the aperture actuator 100, the lens assembly 50, the lens assembly body 61 and 62, and the FPCB 70 are mounted within the shield case 10. The shield case 10 is coupled to the PCB 20 to prevent the components within the shield case 10, such as the aperture module 30, the aperture actuator 100, the lens assembly 50, the lens assembly body 61 and 62, and the FPCB 70 from detaching in one direction (e.g., upward or downwards in the Z-axis direction).

The aperture module 30 includes a first aperture cover 31, a second aperture cover 32, blades 33, and a blade controller 34. The first aperture cover 31 is disposed between the shield case 10 and the blade 33 to prevent the blade 33 from detaching. The first aperture cover 31 includes a circular or polygonal open cover hole 31*h* and is configured to cover or overlap the blade 33, the blade controller 34, and the lens assembly 50 from the top in the downward direction. The second aperture cover 32 is disposed between the shield case 10 and the aperture module 30 and prevents at least some parts of the components of the aperture module 30 and at least part of the lens assembly 50 from detaching in one direction (e.g., in the Z-axis direction, an X-axis, or a Y-axis direction). For example, the second aperture cover 32 may include an upper board and leads. The upper board includes a circular or polygonal aperture 32*h* in the middle, allowing a lens light entrance hole formed by the blades 33 and at least part of the lens assembly 50 to be exposed by the blades 33. The leads may be formed on one side of the upper board (e.g., in a corner area) with a predetermined length and width and may be respectively coupled to the side of the second lens assembly 62 where the lens assembly 50 is seated.

For example, two or six blades 33 may be provided. Alternatively, N blades (where N is a natural number such as 3, 4, or 5) may be provided. The blade controller 34 may fix one side of one of the blades 33, for example, one side of a first blade 33, at the bottom of the first blade 33, and move the first blade in accordance with its movement. The other side of the first blade 33 is connected to a second blade 33 so that the second blade 33 may also move in accordance with the movement of the first blade 33. Accordingly, the blades 33 may move as a whole by rotating in a predetermined direction (e.g., clockwise or counterclockwise) as a whole. That is, as a result of the movement of the blade controller 34, the arrangement of the blades 33 that are connected and fixed together changes, altering the lens light entrance hole. The lens light entrance hole is an opening formed by the blades 33, and the amount of light entering the lens assembly 50 from the outside is adjusted according to the diameter of the lens light entrance hole formed by the blades 33.

The aperture actuator 100 includes a coil 101, a moving drive magnet 102, a fixed drive magnet 103, a hall sensor 104, and a bistable voice coil motor (VCM). The aperture actuator 100 is connected to the blade controller 34.

The lens assembly 50 and the blades 33 and the blade controller 34, which are disposed on the top surface of the lens assembly 50, may be positioned within the aperture upper cover 31 and the aperture side case 32. The blade controller 34 includes an adjustment portion, which is connected to the sides of the blades 33 and is length-adjustable, and a slide part 35, to which the moving drive magnet 102 is coupled. The slide part 35 of the blade controller 34 includes a groove for accommodating the moving drive magnet 102, and the moving drive magnet 102 is attached to the groove of the slide part 35. In some embodiments, the slide part 35 may further include sliding movement elements at both ends of the backside of the surface where the moving drive magnet 102 is accommodated. The sliding movement element may be implemented as at least one ball for the convenience of movement of the moving drive magnet 102 in the blade controller 34.

The blade controller 34 and the blades 33 adjust the lens light entrance hole by moving in accordance with the movement of the moving drive magnet 102.

The moving drive magnet 102 and the fixed drive magnet 103 may be implemented as dual-pole magnets. In some embodiments, each of the moving drive magnet 102 and the fixed drive magnet 103 includes a plurality of pole magnets that are alternately arranged along the direction of movement of the moving drive magnet 102 to adjust the distance of movement of the moving drive magnet 102. That is, the moving drive magnet 102 includes a plurality of first pole magnets with alternating polarities along the direction of movement of the moving drive magnet 102 (e.g., a first or second alternating polarity). The fixed drive magnet 103 includes a plurality of second pole magnets with alternating polarities to correspond to the moving drive magnet 102.

In some embodiments, the pole magnets may be dual-pole magnets where magnets with different polarities on their front and back surfaces are attached together. In some embodiments, at a reference point for the moving drive magnet 102 (i.e., a point where the movement of the moving drive magnet is zero), identical sets of polarities may be arranged on the opposing surfaces of the moving drive magnet 102 and the fixed drive magnet 103 so that a repulsive force may be exerted between the moving drive magnet 102 and the fixed drive magnet 103. For example, if the moving drive magnet 102 is a magnet with an N-S-N-S pole arrangement, then the fixed drive magnet 103 may also be a magnet with the N-S-N-S pole arrangement. For example, the moving drive magnet 102 and the fixed drive magnet 103 may be dual-pole magnets, where their facing surfaces are aligned in an N-S pole arrangement and their opposite surfaces are aligned in an S-N pole arrangement. For example, the fixed drive magnet 103 may be a dual-pole magnet, with one surface facing the moving drive magnet 102 aligned in the N-S pole arrangement and its reverse surface aligned in the S-N pole arrangement.

In some embodiments, assuming that the diameter of the lens light entrance hole is adjustable between N stages (where N is a natural number of 2 or greater), the moving distance of the moving drive magnet 102 may be fixed to N points. In this case, each of the moving drive magnet 102 and the fixed drive magnet 103 may include (N−1) dual-pole magnets. For example, in a case where there are four adjustable stages for the diameter of the lens light entrance hole, the moving drive magnet 102 may have an N-S-N-S pole arrangement on its front surface (and an S-N-S-N pole arrangement on its rear surface), and the fixed drive magnet 103 may also have the N-S-N-S pole arrangement on its front surface (and the S-N-S-N pole arrangement on its rear surface).

The lens assembly 50 may include one or more lenses and a lens barrel. The lenses may be moved vertically or tilted within the lens barrel to focus. The lenses may be moved by an actuator or an optical image stabilization (OIS) actuator. Meanwhile, the lens module 50 may collect incident light from the outside and transmit the collected light to an image sensor located on the PCB 20 below the lens barrel. In some embodiments, at least one lens may be provided. The lens barrel may surround the at least one lens and provide an optical path to transmit light incident through the at least one lens to the image sensor.

The lens assembly body 61 and 62 includes first and second lens assembly bodies 61 and 62. The first lens assembly body 61 and the second lens assembly body 62 both include circular openings with their top and bottom surfaces open on an X-Y plane and thus accommodate the lens assembly 50.

The first lens assembly body 61 includes an open lens assembly accommodating area 61*h* at its top. Also, the first lens assembly body 61 includes, on its side, a slide coupling area 61*a* and a drive magnet fixing area 61*b*, which guide the movement of the slide part 35.

In some embodiments, the lens assembly accommodating area 61*h*, which is a circular or polygonal opening that is open in the Z-axis direction to prevent the detachment of the lens assembly 50, may have a fixed shape.

The slide coupling area 61*a* is disposed on one side of the first lens assembly body 61 and is coupled with the slide part 35. In some embodiments, the slide coupling area 61*a* may further include a rail that guides the movement of the sliding movement element. In some embodiments, the slide coupling area 61*a* may include stroke limiters at either end thereof to prevent wear due to collision with the slide part 35.

The drive magnet fixing area 61*b* includes a groove for accommodating the fixed drive magnet 103. The slide coupling area 61*a* and the drive magnet fixing area 61*b* of the first lens assembly body 61 are disposed on the side of the first lens assembly body 61 facing the slide part 35. Since the slide part 35 and the drive magnet fixing area 61*b* face each other, the moving drive magnet 102 is disposed to face the fixed drive magnet 103.

The second lens assembly body 62 is positioned to cover or overlap the bottom surface in the Z-axis direction and a side of the first lens assembly body 61. The second lens assembly body 62 may include, on its bottom surface, an opening 62*h* to be coupled with the lens assembly 50.

In some embodiments, when the first and second lens assembly bodies 61 and 62 are assembled in the Z-axis direction, a side opening that is partially open on the side of the lens assembly body 61 and 62 may be formed. For example, the second lens assembly body 62 may include a first opening 62*a*, which is formed at a position corresponding to the slide coupling area 61*a* of the first lens assembly body 61. In some embodiments, the first opening 62*a* of the second lens assembly body 62 may be open with a greater in the X-axis direction than the slide coupling area 61*a* of the first lens assembly body 61.

The FPCB 70 is disposed between the second lens assembly body 62 and the frame 63. The FPCB 70 may include actuators 71 or optical image stabilization (OIS) actuators 71 for performing OIS routines internally. The first and second lens assembly bodies 61 and 62 may be shaped to accommodate the OIS actuators 71. For example, the second lens assembly body 62 may include at least one OIS opening at its top in the Z-axis direction, thereby allowing the OIS actuators 71 to be accommodated in the OIS opening. The OIS opening may be disposed on a different side of the second lens assembly body 62 than the first opening 62*a*. For example, the second lens assembly body 62 may include the first opening 62*a* on its first side to accommodate the slide part 35 coupled with the moving drive magnet 102, a second opening on its second side to accommodate the OIS actuators 71, and a third opening on its third side to accommodate the OIS actuators 71.

The frame 63 may include frame sidewalls arranged to at least partially surround the aperture module 30, the lens assembly 50, the lens assembly body 61 and 62, and the FPCB 70. Each of the frame sidewalls may have an opening to expose the actuators 71, the OIS actuators 71, and the aperture actuator 100 to the outside. For example, the aperture actuator 100 may be disposed in a first opening 63*a* in a first frame sidewall of the frame 63, the actuators 71 may be disposed in a second opening in a second frame sidewall of the frame 63, and the OIS actuators 71 may be disposed in a third opening in a third frame sidewall of the frame 63. The hall sensor 104 and the coil 101 may be disposed on the outside of the first opening 63*a* of the frame 63. The hall sensor 104, which is located at the center of the coil 101, is configured to detect the position of the moving drive magnet 102, and the coil 101 moves the moving drive magnet 102 based on a current applied thereto, thereby moving the slide part 35.

The PCB 20 may include an image sensor disposed on its top surface. The image sensor may be disposed on the PCB 20 at a position corresponding to a lower part of the lens barrel of the lens assembly 50. The PCB 20 may be electrically connected to the driver chip 40 through the flex board 45 and connected to its side. The driver chip 40 receives power and control signals from the outside, supplies power to the camera module 1, generates driving signals for the camera module 1, and transmits raw image data generated by the image sensor to an external device.

Referring to FIGS. 2 and 3, the aperture actuator 100 includes the coil 101, the moving drive magnet 102, the fixed drive magnet 103, and the hall sensor 104.

The hall sensor 104 may detect the positions of the moving drive magnet 102 and the fixed drive magnet 103 and transmit the detected positions to the driver chip 40. The driver chip 40 may control the current applied to the coil 101 based on the detected positions of the moving drive magnet 102 and the fixed drive magnet 103.

The coil 101 receives a driving current from a VCM and may generate a Lorentz force for the moving drive magnet 102.

The hall sensor 104 and the coil 101 are disposed in one of the openings of the frame 63, and the moving drive magnet 102 is disposed in the groove of the slide part 35. The fixed drive magnet 103 is disposed in the groove of the first lens assembly body 61. The first lens assembly body 61 includes a lens assembly accommodating area 61*h* and a drive magnet fixing area 61*b*. The drive magnet fixing area 61*b*, which is on one side of the first lens assembly body 61, has a shape that protrudes or extends in the Y-axis direction while being recessed upwardly in the Z-axis direction and has an inner groove formed on its protruding part so that the fixed drive magnet 103 may be coupled with the inner groove.

Figure 4:
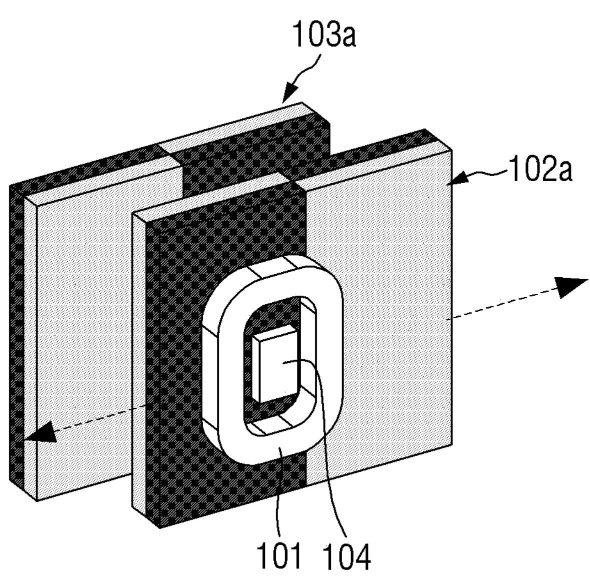
FIGS. 4 and 5 are conceptual diagrams illustrating an aperture actuator according to some embodiments of the present disclosure.
Figure 5:
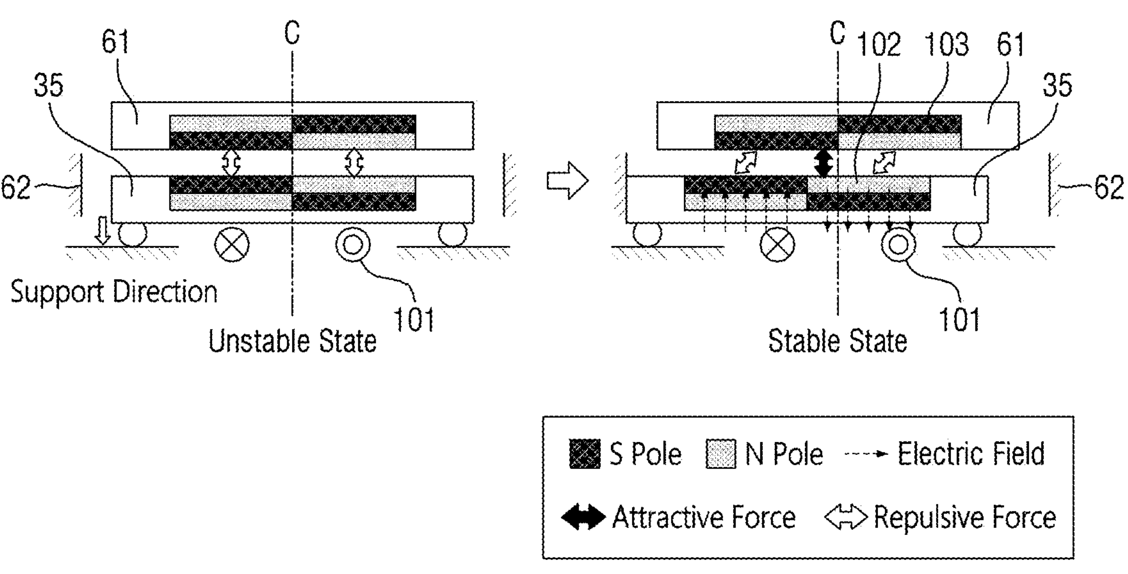

FIGS. 4 and 5 are conceptual diagrams illustrating an aperture actuator according to some embodiments of the present disclosure.

Referring to FIGS. 4 and 5, a moving drive magnet 102*a* moves in the X-axis direction depending on the direction of a generated electric field. For example, the moving drive magnet 102*a* may move in the X-axis direction from the central axis of a fixed drive magnet 103*a*. The slide part 35 moves according to an attractive or repulsive force between the moving drive magnet 102*a* and the fixed drive magnet 103*a*, and the blades 33, which are connected to one side of the blade controller 34, also move accordingly. That is, changes in the repulsive force of the moving drive magnet 102*a* cause the blades 33 to move, thereby altering the diameter of the lens light entrance hole.

Referring to FIGS. 4 and 5, the driver chip 40 uses a VCM to control the current applied to the coil 101. The coil 101 generates an additional electric field on the moving drive magnet 102*a* through current control of the VCM.

For example, before the application of a current to the coil 101, the moving drive magnet 102*a* and the fixed drive magnet 103*a* are arranged so that identical sets of polarities face each other. That is, if the moving drive magnet 102*a* and the fixed drive magnet 103*a* are arranged to have their opposing surfaces both aligned as S-N, a repulsive force may exert between the moving drive magnet 102*a* and the fixed drive magnet 103*a*. When a state where first and second repulsive forces on the left and right sides, respectively, of a central axis C of the fixed drive magnet 103*a* become equal is referred to as a reference state. In the reference state, the central axis of the moving drive magnet 102*a* may be placed on the same axis as the reference point or may be misaligned with the reference point.

In the reference state, the balance from the repulsive force between the moving drive magnet 102*a* and the fixed drive magnet 103*a* becomes unstable because it can be disrupted by a change in the magnitude of the first or second repulsive force.

Specifically, when a current is applied to the coil 101, an electric field is generated, thereby causing an additional Lorentz force to act on the moving drive magnet 102*a*. That is, a force that pushes away the left S pole of the moving drive magnet 102*a* and attracts the right N pole of the moving drive magnet 102*a* is generated in accordance with the electric field. As a result, an imbalance in the repulsive force between the moving drive magnet 102*a* and the fixed drive magnet 103*a* is created by the Lorentz force.

Due to the imbalanced repulsive force, the moving drive magnet 102*a* shifts in the X-axis direction from the reference point to transition from an unstable to a stable state. For example, as illustrated in FIG. 5, the moving drive magnet 102a moves to the left in the X-axis direction in accordance with the Lorentz force. As a result, the directions of the repulsive and attractive forces between the moving drive magnet 102a and the fixed drive magnet 103a alter as the same poles repel each other and different poles attract each other. In some embodiments, the moving drive magnet 102a moves to a position where the altered repulsive and attractive forces balance each other. Alternatively, due to the altered repulsive and attractive forces, the moving drive magnet 102a may move to a position where the stroke limiters are positioned on either end of the slide coupling area 61a. The hall sensor 104 detects the position of the moving drive magnet 102a and transmits the results of the detection to the driver chip 40.

Figure 6A:
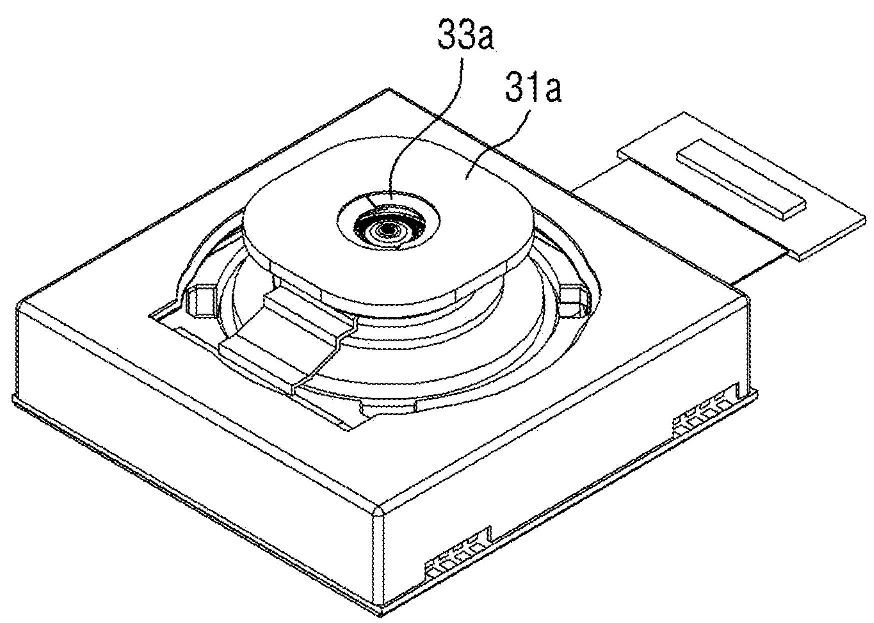
FIGS. 6A and 6B are perspective views illustrating a camera module with a closed aperture according to some embodiments of the present disclosure.
Figure 6B:
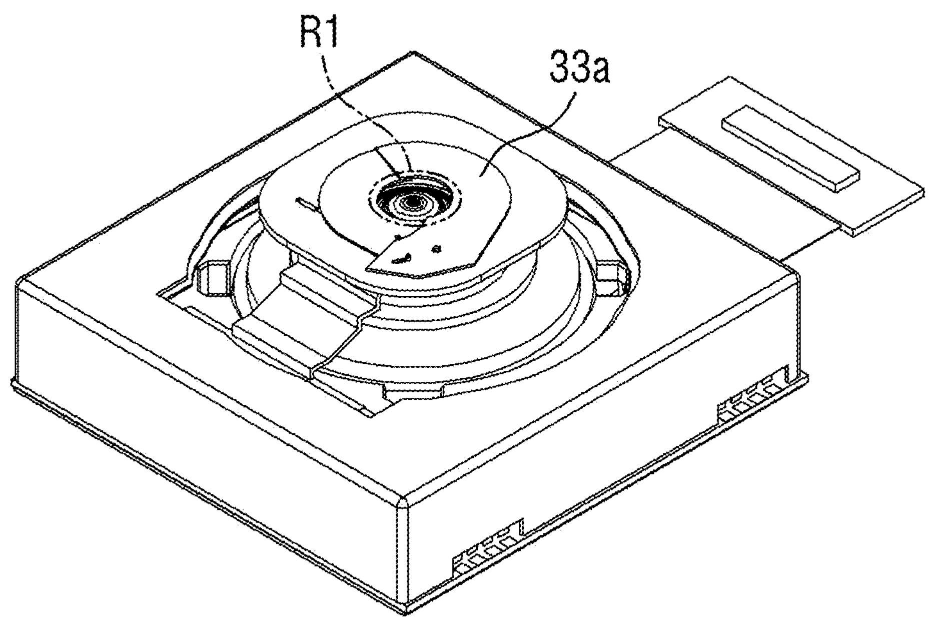
Figure 7:
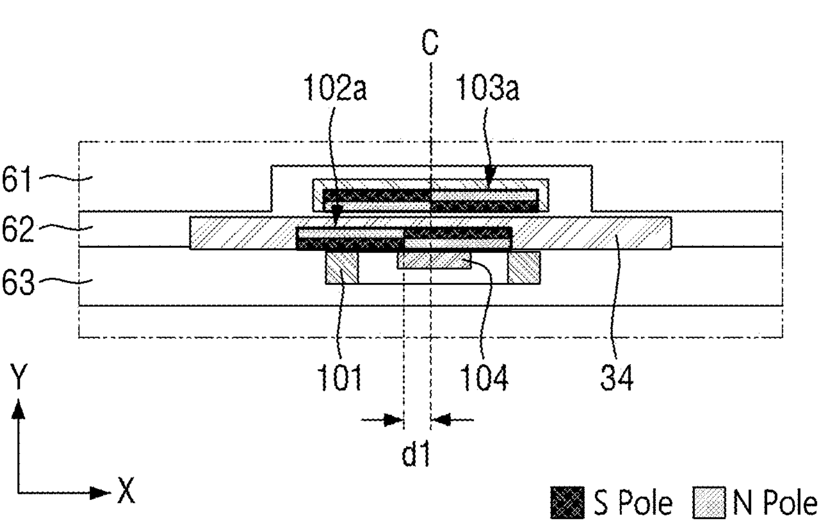
FIG. 7 is a cross-sectional view illustrating an aperture actuator with a closed aperture according to some embodiments of the present disclosure.

FIGS. 6A and 6B are perspective views illustrating a camera module with a closed aperture according to some embodiments of the present disclosure. FIG. 7 is a cross-sectional view illustrating an aperture actuator with a closed aperture according to some embodiments of the present disclosure.

Referring to FIGS. 6A and 6B, a state where the aperture is closed refers to a state where the diameter of the lens light entrance hole formed by the blades 33 reaches a predetermined minimum diameter R1. The diameter of the lens light entrance hole when the aperture is closed, i.e., the minimum diameter R1, is smaller than the diameter of the circular opening of the first aperture cover 31a. Therefore, the blades 33a forming the lens light entrance hole may be partially exposed to the outside by the circular opening of the first aperture cover 31a.

Referring to FIG. 7, when the aperture is closed, the distance between the central axes of the moving drive magnet 102a and the fixed drive magnet 103a may be set to d1, where d1 is a positive real number of 0 or greater. In some embodiments, by not applying a current to the coil 101, the VCM may set the distance between the central axes of the moving drive magnet 102a and the fixed drive magnet 103a to d1. When the distance between the central axes of the moving drive magnet 102a and the fixed drive magnet 103a is d1, the diameter of the lens light entrance hole formed by the blades 33a may become the minimum diameter R1, as illustrated in FIG. 6B.

Figure 8A:
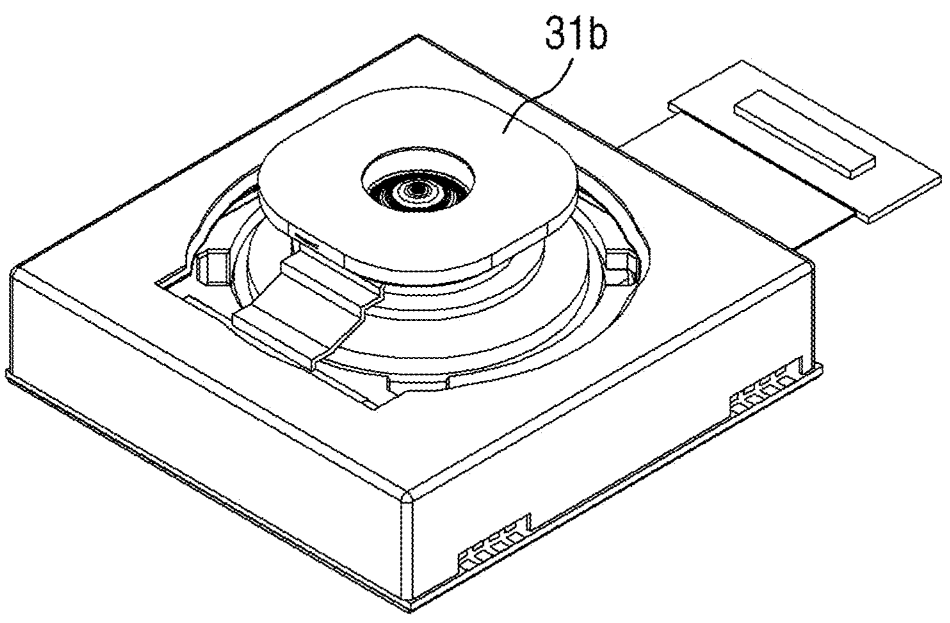
FIGS. 8A and 8B are perspective views illustrating a camera module with an open aperture according to some embodiments of the present disclosure.
Figure 8B:
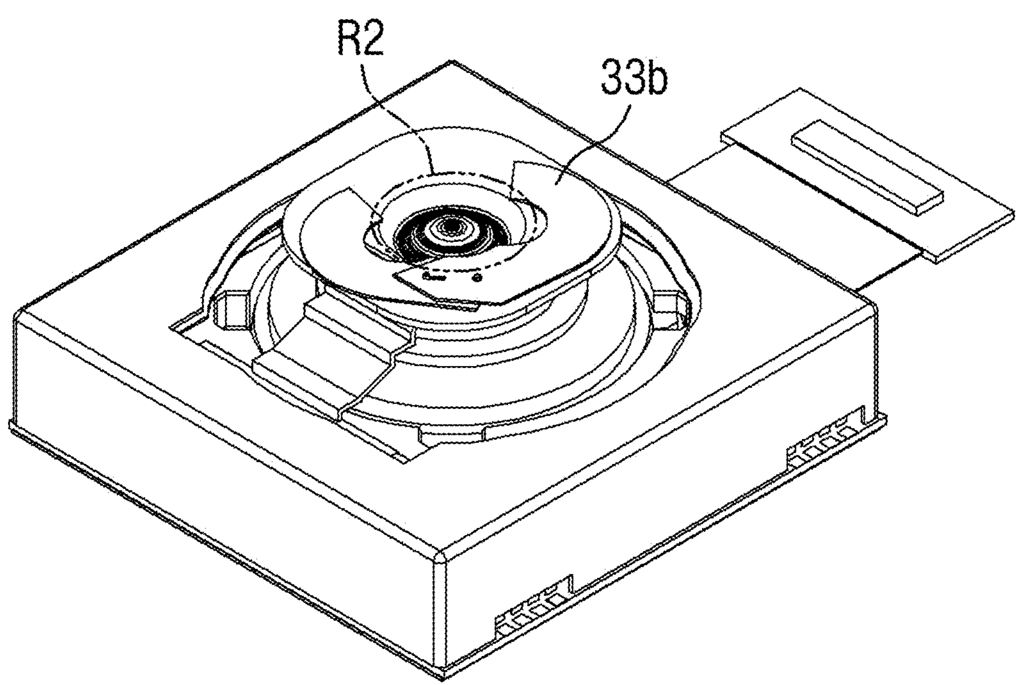
Figure 9:
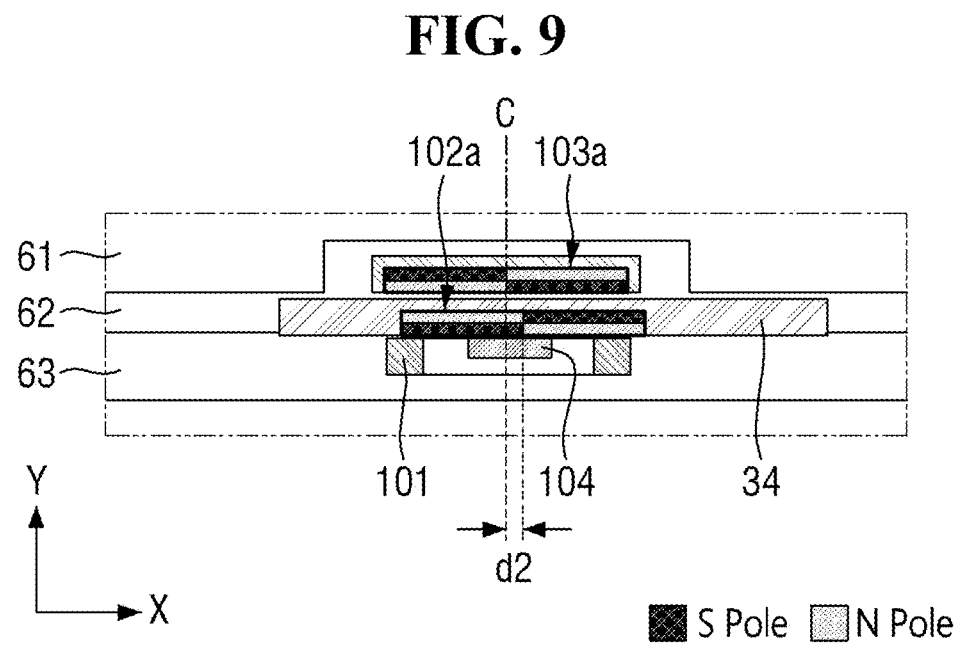

FIGS. 8A and 8B are perspective views illustrating a camera module with an open aperture according to some embodiments of the present disclosure. FIG. 9 is a side view illustrating an aperture actuator with an open aperture according to some embodiments of the present disclosure.

Referring to FIGS. 8A and 8B, a state where the aperture is open refers to a state where the diameter of the lens light entrance hole formed by the blades 33 reaches a predetermined diameter R2.

In some embodiments, when the aperture is open, the diameter of the lens light entrance hole formed by the blades 33b, i.e., the diameter R2, may become greater than the minimum diameter R1, as illustrated in FIG. 7B. For example, when the aperture is fully opened, the diameter of the lens light entrance hole formed by the blades 33b may be greater than the diameter of the circular opening of the first aperture cover 31b. In this example, the blades 33b forming the lens light entrance hole may not be exposed to the outside by the circular opening of the first aperture cover 31b.

Referring to FIG. 9, when the aperture is open, the distance between the central axes of the moving drive magnet 102a and the fixed drive magnet 103a may change to d2, where d2 is a real number. In some embodiments, by applying a predetermined second current to the coil 101, the VCM may set the distance between the central axes of the moving drive magnet 102a and the fixed drive magnet 103a to d2.

To adjust the extent to which the aperture is open, the VCM may vary the second current applied to the coil 101 in various manners. For example, the second current may be changed based on an autofocus function or according to a control signal based on user operation. When the distance between the central axes of the moving drive magnet 102a and the fixed drive magnet 103a is d2, the diameter of the lens light entrance hole formed by the blades 33a may become R2, as illustrated in FIG. 8B.

To adjust the extent to which the aperture is open, each of the moving drive magnet 102a and the fixed drive magnet 103a may include a plurality of pole magnets with alternating polarities in the direction of movement of the moving drive magnet 102a. For example, if each of the moving drive magnet 102a and the fixed drive magnet 103a includes four dual-pole magnets, the diameter of the lens light entrance hole can be adjusted between five diameters, i.e., R1, R21, R22, R23, and R24 where $R1<R21<R22<R23<R24$. In this example, the second current applied to the coil 101 may be altered between four levels respectively corresponding to the diameters R21, R22, R23, and R24, while for the diameter R1, no second current may be applied to the coil 101.

As described above, the camera module according to some embodiments of the present disclosure can adjust the aperture using a repulsive force with fewer drive magnets. Moreover, by using only drive magnets without yokes, the manufacturing cost of the camera module can be reduced, and the production of the camera module can be simplified.

Figure 10A:
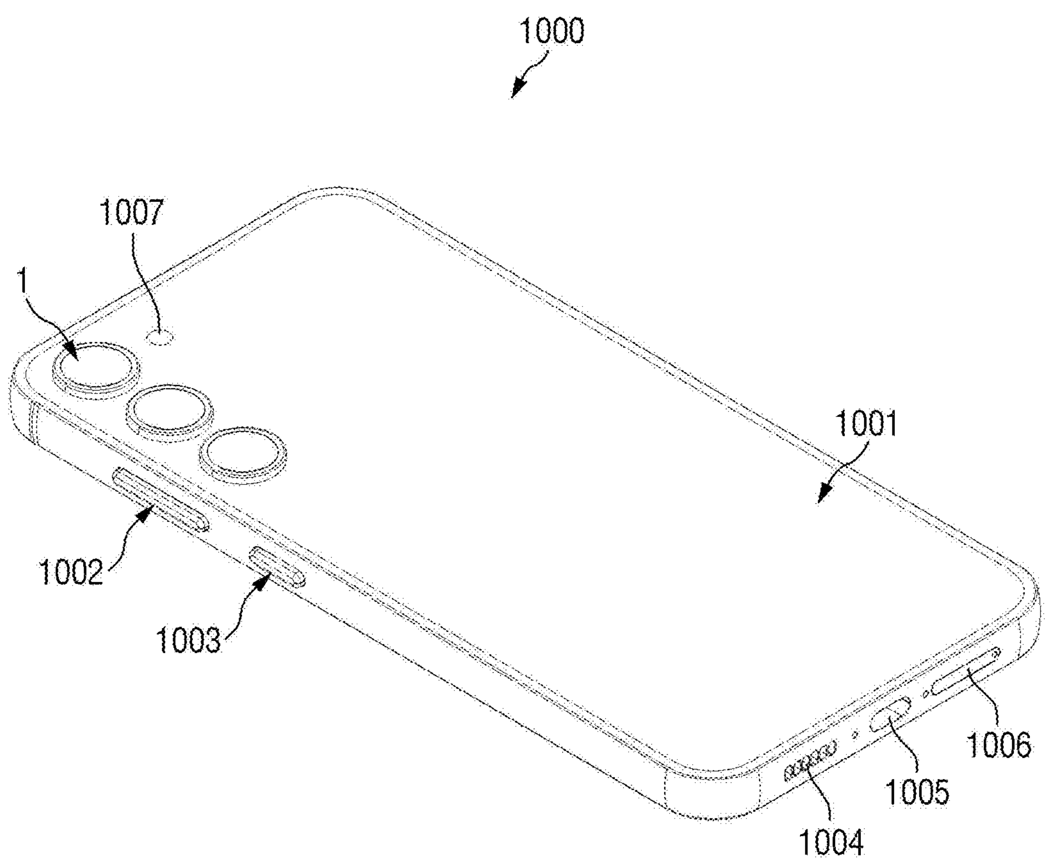
FIG. 10A is a perspective view illustrating an electronic device according to an embodiment of the present disclosure.
Figure 10B:
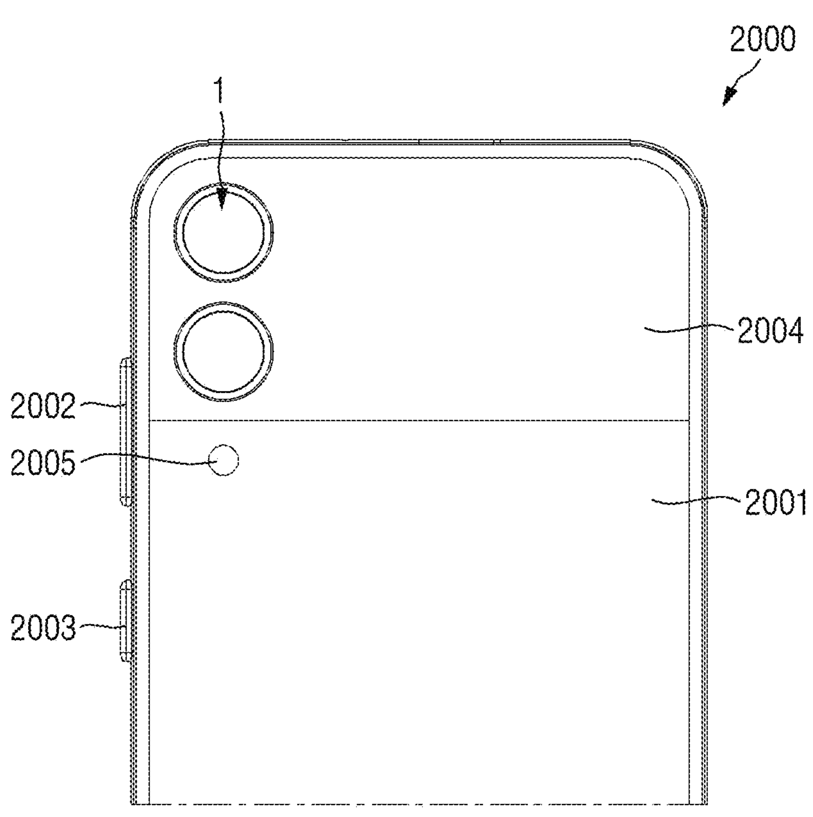
FIG. 10B is a cross-sectional view illustrating an electronic device according to another embodiment of the present disclosure.

FIG. 10A is a perspective view illustrating an electronic device 1000 according to an embodiment of the present disclosure. FIG. 10B is a cross-sectional view illustrating an electronic device 2000 according to another embodiment of the present disclosure.

Referring to FIG. 10A, the electronic device 1000 may include a rear housing 1001 and may further include, on its sides, key input devices 1002 and 1003, a connector hole 1005, an audio module 1004, and a plate 1006, which is for housing a communication chip inside the electronic device 1000. Although not illustrated, the electronic device 1000 may further include an indicator (e.g., a light-emitting diode (LED) device) or various sensor modules.

Referring to FIG. 10B, the electronic device 2000 includes a rear housing 2001 and may further include, on its side, key input devices 2002 and 2003, a partial display 2004, and an indicator 2005. Although not illustrated, the electronic device 2000 may include various components described above with reference to FIG. 10A.

Each of the electronic devices 1000 and 2000 may be implemented as a multi-camera system including two or more camera modules 1. For example, the electronic device 1000 may include three camera modules 1, and the electronic device 200 may include two camera modules 1. The arrangement of the camera modules 1 in each of the electronic devices 1000 and 2000 may vary.

For example, the camera modules 1 may include a first camera module, which functions as a main wide camera, a second camera module, which functions as an ultra-wide camera, and a third camera module, which functions as a telephoto camera.

The image sensor of the first camera module may have a basic Bayer pattern of red-green-green-blue (RGGB), a Quad Bayer pattern with red-green-blue (RGB) arranged in 2×2, or a color filter pattern that overall forms a Bayer pattern with RGB arranged in 4×4. The image sensor of the first camera module is configured to have a larger size than that of the second or third camera module.

For example, if the image sensor of the first camera module has a size of 1/1.3" or greater, the camera module of FIGS. 1 through 9B may be implemented as the first camera module. However, the second and third camera modules may not be implemented as illustrated in FIGS. 1 through 9B. That is, since the image sensor of the first camera module has the largest size, only the first camera module in a multi-camera module may be implemented as illustrated in FIGS. 1 through 9A, considering the space constraints for the entire multi-camera module.

While the embodiments of the present disclosure have been described with reference to the attached drawings, those skilled in the art will understand that the invention can be implemented in other specific forms without changing the technical spirit or essential features of the invention. Therefore, the embodiments described above should be considered in all respects as illustrative and not restrictive.

What is claimed is:

1. A camera module comprising:

a lens assembly;

at least two blades that are on a top surface of the lens assembly and define a lens light entrance hole;

a moving drive magnet;

a fixed drive magnet;

a blade controller that is coupled to the moving drive magnet and to the at least two blades, wherein the blade controller is configured to control a movement of the at least two blades;

a lens assembly body, wherein the lens assembly and the fixed drive magnet are on the lens assembly body; and a frame that at least partially surrounds the lens assembly body and comprises a coil that faces the moving drive magnet, wherein the blade controller is configured to adjust a diameter of the lens light entrance hole by controlling the moving drive magnet to move based on a current applied to the coil.

2. The camera module of claim 1, wherein each of the moving drive magnet and the fixed drive magnet is a dual-pole magnet comprising alternating N-poles and S-poles along a direction of the movement of the moving drive magnet, and wherein the alternating N-poles and S-poles define one of a first alternating polarity and a second alternating polarity.

3. The camera module of claim 2, wherein the diameter of the lens light entrance hole is adjustable between N stages, wherein N is a natural number, wherein the moving drive magnet comprises (N−1) first dual-pole magnets, wherein a first surface of each of the (N−1) first dual-pole magnets has the first alternating polarity, and wherein a second surface of each of the (N−1) first dual-pole magnets has the second alternating polarity.

4. The camera module of claim 3, wherein the fixed drive magnet comprises (N−1) second dual-pole magnets, wherein a first surface of each of the (N−1) second dual-pole magnets has the first alternating polarity and faces the moving drive magnet.

5. The camera module of claim 1, wherein the frame comprises a hole sensor that is configured to detect a position of the moving drive magnet and a position of the fixed drive magnet.

6. The camera module of claim 1, further comprising:

a driver chip that is configured to control a voice coil motor (VCM) that is coupled to the coil.

7. A camera module comprising:

a lens assembly;

at least two blades that are on a top surface of the lens assembly and define a diameter of a lens light entrance hole;

a moving drive magnet;

a fixed drive magnet;

an aperture cover that is on top surfaces of the at least two blades and comprises a circular opening that overlaps the lens light entrance hole;

a blade controller comprising a connector portion that is connected to bottom surfaces of the at least two blades, wherein the blade controller comprises a slide part that accommodates the moving drive magnet, and wherein the blade controller is configured to adjust a length of the connector portion based on a movement of the moving drive magnet;

a first lens assembly body comprising a slide coupling area and a groove, wherein the slide coupling area is on a first side of the first lens assembly body that faces a first surface of the moving drive magnet and is coupled with the slide part, and wherein the groove accommodates the fixed drive magnet;

a second lens assembly body defining an opening on a first side of the second lens assembly body that faces the slide coupling area; and a frame comprising a coil on a first side that faces a second surface of the moving drive magnet that is opposite to the first surface of the moving drive magnet, wherein the blade controller is configured to adjust a diameter of the lens light entrance hole by moving the moving drive magnet based on a current applied to the coil.

8. The camera module of claim 7, wherein the slide coupling area further comprises stroke limiters on at least one end of the slide coupling area.

9. The camera module of claim 7, wherein the moving drive magnet comprises a plurality of first pole magnets that each comprise a first alternating polarity along a movement direction of the moving drive magnet.

10. The camera module of claim 9, wherein the fixed drive magnet comprises a plurality of second pole magnets that each comprise the first alternating polarity.

11. The camera module of claim 9, wherein the blade controller is configured to move the moving drive magnet by a distance corresponding to at least one first pole magnet from among the first pole magnets in response to the current being applied to the coil.

12. The camera module of claim 7, further comprising:

a printed circuit board (PCB) below the frame, wherein the PCB comprises an image sensor that is on a bottom surface of the camera module and is configured to receive light through the lens assembly; and a driver chip that is electrically connected to the PCB through a flex board and is configured to control the current applied to the coil.

13. The camera module of claim 12, wherein the frame comprises a hole sensor that is configured to detect a first position of the moving drive magnet and a second position of the fixed drive magnet, and wherein the hole sensor is configured to transmit the first and second positions to the driver chip.

14. A camera module comprising:

a lens assembly comprising a lens;

blades that are on a top surface of the lens and define a lens light entrance hole;

a blade controller comprising a connector portion and a slide part that are coupled to the blades and configured to control a movement of the blades;

an aperture actuator comprising a moving drive magnet that is in the slide part, a fixed drive magnet that is on a first surface of the moving drive magnet, a coil that is on a second surface of the moving drive magnet, and a hole sensor that is configured to detect a position of the moving drive magnet; and a driver chip configured to control a current applied to the coil based on the position of the moving drive magnet.

15. The camera module of claim 14, further comprising:

a first lens assembly body that comprises a lens assembly accommodating area that is on a top surface of the first lens assembly body and accommodates the lens assembly, a drive magnet fixing area that is on a first side of the first lens assembly body and accommodates the fixed drive magnet, and a slide coupling area that is above the drive magnet fixing area and is configured to guide the slide part.

16. The camera module of claim 15, further comprising:

a second lens assembly body that defines an opening having a larger width than a width of the slide coupling area, wherein the second lens assembly body faces the first side of the first lens assembly body.

17. The camera module of claim 16, further comprising:

a frame comprising sidewalls that at least partially surround the first and second lens assembly bodies, wherein the coil and the hole sensor are on a first side of the frame.

18. The camera module of claim 14, wherein the moving drive magnet comprises a plurality of first pole magnets that each comprise a first alternating polarity along a movement direction.

19. The camera module of claim 18, wherein the fixed drive magnet comprises a plurality of second pole magnets that each comprise the first alternating polarity.

20. The camera module of claim 18, wherein the blade controller is configured to move the moving drive magnet by at least one first pole magnet from among the first pole magnets in response to the current being applied to the coil.

* * * * *